3,040,926
MOLDED PLASTIC OUTLET BOXES WITH ATTACHED METAL MOUNTING BRACKETS
Lewis E. Palmer, Washington, W. Va., assignor to Union Insulating Co., Inc., Parkersburg, W. Va., a corporation of West Virginia
Filed Feb. 20, 1961, Ser. No. 90,296
8 Claims. (Cl. 220—3.9)

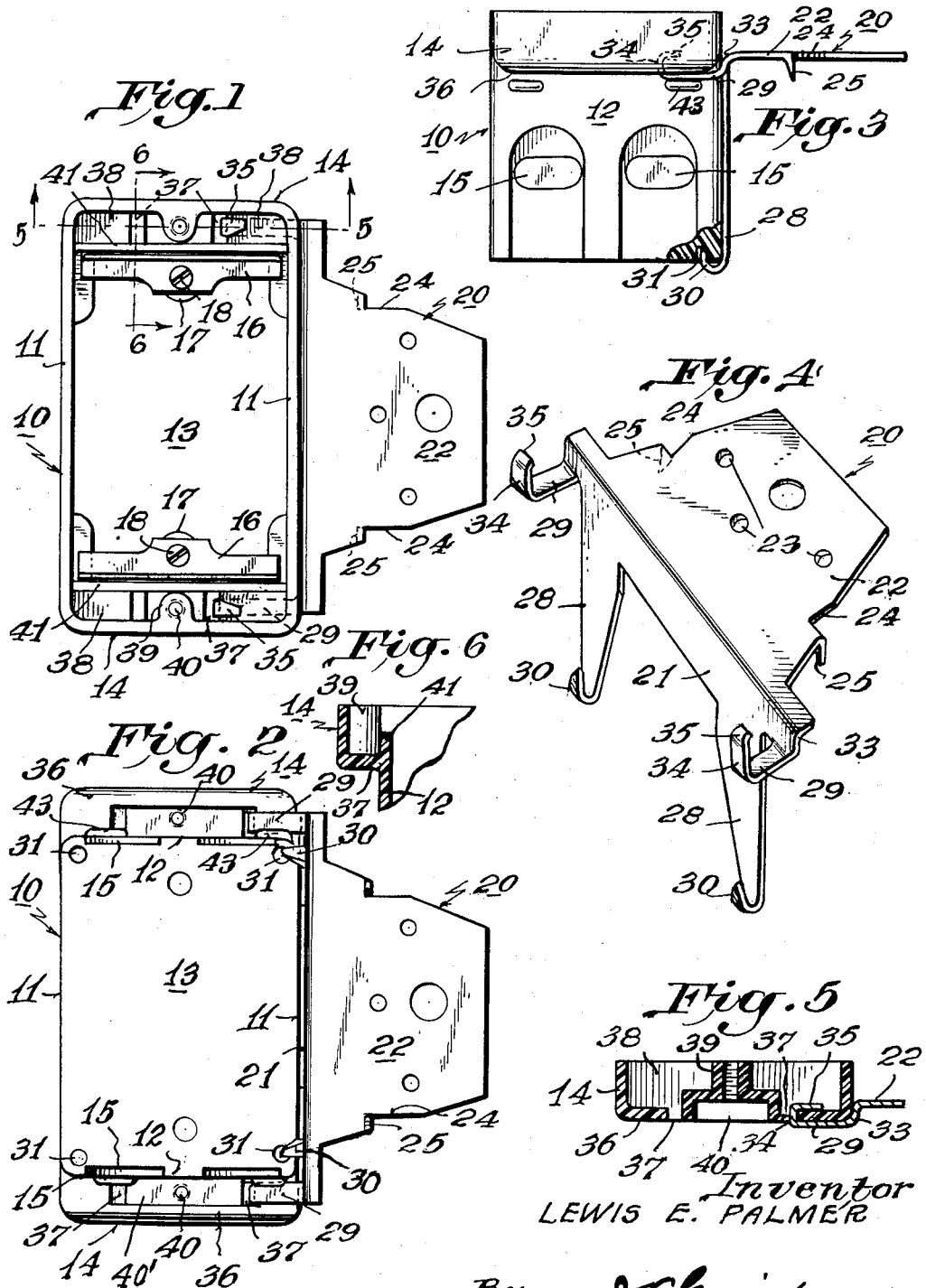
June 26, 1962  L. E. PALMER  3,040,926
MOLDED PLASTIC OUTLET BOXES WITH ATTACHED
METAL MOUNTING BRACKETS
Filed Feb. 20, 1961
Inventor
LEWIS E. PALMER
By J. W. Greisbauer
Attorney United States Patent Office 3,040,926
Patented June 26, 1962

This invention relates to non-metallic electrical outlet and junction boxes with attached metal brackets for mounting them on studs or other framework of a building structure, and it relates more particularly to means for attaching a metal mounting bracket to a switch or outlet box after it has been molded of phenolic resin or similar insulating plastic material.

In the past metal mounting brackets have been molded in the plastic material of the box, but the molding-in of such brackets is a difficult and expensive operation. It puts limitations on the types of materials and methods of molding that can be used, and in some cases, provides a weak connection between the box and bracket. The bracket when fastened to the face of a stud or other wall structure by nails or screws, must be thin enough to be covered by the plaster or wall board without causing objectionable unevenness, and it is therefore impractical to use a plastic mounting bracket molded integrally with the box.

One object of the invention is to provide a strong and effective connection of a metal mounting bracket to a molded plastic box by disposing the body portion of the bracket against a flat side wall portion of the box and fixing such body portion by a pair of arms on the bracket disposed at the ends of the flat side wall portion of the box and clinching the ends of the arms in apertures formed in lateral extensions molded at the ends of the flat side wall portion adjacent the open face of the box.

Another object of the invention is to provide a strong and effective connection of a metal mounting bracket to a molded plastic box by attaching the bracket to the box at a plurality of widely spaced points around the peripheral portion of a flat side wall portion of the box.

Another object is to provide a connection between the box and the bracket which embodies bendable arms on the bracket clinched in openings in lateral extensions molded at the ends of the open face of the box and also one or more additional arms or portions that are hooked into engagement with holes or recesses at or near the bottom of the box body, so that the several attaching arms or portions are widely spaced to provide a strong and effective joinder of the bracket to the plastic material of the box.

Another object is to provide coacting means on the separately formed plastic box and metal bracket so that they may be quickly and easily assembled and then securely united by a power press operation, so that the unitary assemblage of box and bracket will be extremely strong and may be produced at a relatively low cost.

Another object is to provide a metal mounting bracket of such structure that, when mounted on a molded plastic box, will not only provide a strong connection but will also serve to reenforce and strengthen the plastic box.

Another object is to provide a mounting bracket with attaching arms having bendable portions to enter the box through holes in the bottoms of recessed extensions at the ends of the open face of the box so that the bent portions within the box will be spaced and shielded from the electrical conductors that enter the box and from parts of a switch or other device mounted in the body portion of the box.

Another object is to so construct the box that the bracket may be applied to either of its sides for convenience of assembly and to permit a ground plate, if used, to be placed at either the upper or lower portion of the box when it is mounted on a stud.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:
FIG. 1 is a top or front face view of a box and its attached bracket;
FIG. 2 is a rear or bottom plan view;
FIG. 3 is an end view with parts broken away and in section;
FIG. 4 is a perspective view of the bracket showing its shape before being applied to the box; and
FIGS. 5 and 6 are detail sectional views taken on the line 5—5 and 6—6 respectively in FIG. 1.

Referring more in detail to the drawings the numeral 10 denotes the body of a box which is shown as of rectangular shape with side walls 11, end walls 12, a bottom wall 13 and the usual open face or front. At its ends adjacent its open face are laterally and transversely projecting extensions 14 which are recessed and communicate with the interior of the box as presently explained. In each end wall there may be formed two knockouts 15. On the inner sides of the end walls are the usual angular clamping elements 16 for clamping one or more of the cables entered through the knockouts. These clamps 16 have upright portions slidable against the end walls and inwardly extending cable engaging portions which press the cables down against shoulders 17 molded in the box at the juncture of its bottom and side walls, when centrally positioned screws 18 are screwed down into openings in the enlargements forming the shoulders. The box is molded in accordance with the disclosure in the Parker Patent No. 2,352,913, July 4, 1944, and hence may be molded of phenolic resin or similar hard plastic insulating material in the most simple type of molding press in which the movable die part has a straight line movement and there are no laterally movable die parts.

The metal mounting bracket 20 is made from a single piece of sheet metal and has, in addition to some means whereby it may be fastened to a stud or the like, a flat body portion or face plate 21 adapted to lie opposite and against one of the flat side walls of the box and to engage one side of the stud on which the box is mounted. When the bracket is to be fastened to the outer face or edge of the stud, a right angularly projecting attaching portion or plate 22 will be used as shown in the preferred embodiment illustrated in the drawings. This flat attaching plate 22 is about as long as the box body and it is formed with two or more holes 23 to receive nails or screws to fasten it against the edge of a stud. If desired, its converging end edges may be formed with slits 24 to permit portions to be bent to provide pointed tabs or prongs 25 that are driven into the stud. The bracket is preferably stamped from a sheet of metal of suitable gage and its parts then bent so that when it comes from the punch press it is in the form shown in FIG. 4.

The box engaging plate 21 is of substantial area and preferably of greater length than the box. It may be variously shaped, but at its top it has at or near its ends two attaching arms 29 adapted to underlie the endwise projecting extensions 14 and to receive between them the end walls 12 of the box body. The arms 29 are fixed in the extensions as later described. The plate 21 may also have one or more additional rearwardly projecting attaching arms 28 with bent ends forming hooks 30 adapted to be engaged with seats or recesses molded in the box body at points remote from points of attachment of the upper arms 29 in order to obtain an extremely strong and effective connection of the bracket to the box. As shown, the two rear or lower arms 28 are formed by removing the central and outer or rear portion of the plate 21 so that the arms are tapered and disposed at or near the ends of the box body. The arms 28 are preferably as long as the depth or height of the box and their hooks 30 may be engaged with holes or recesses 31 formed in the bottom 13 near the adjacent corners of the box. Preferably the holes or seats 30 are formed near all four corners of the bottom 13 so that the bracket may be fastened against either of the flat side wall portions 11.

When the bracket is fastened to the edge of the stud by the plate 22, the upper attaching arms 29 are positioned on the plate 21 opposite the extensions 14 and the latter have in their bottom walls openings in which the extremities of the arms may be entered and then bent by a power press as presently described. As shown, the inner portions of the arms 29 are straight and flat and are disposed in a plane at right angles to the plate 21. Those flat portions of the arms may be disposed in the same plane as the plate 22 or in an off-set plane as shown in FIGS. 3 and 4. By providing the off-set 33, the attaching plate 22 may be disposed at the desired distance from the plane of the open face of the box according to the thickness of the wallboard or plaster coat forming the outer surface of the wall in which the box is installed.

As previously indicated the flat arm portions 29 are adapted to supportingly engage the flat bottom walls 36 of the extensions 14 and their right angularly and upwardly bent portions 34 are adapted to extend into openings 37 therein, the extremities 35 of the arms being later bent down, as seen in FIG. 5. The extremities 35 are slightly bent, as shown in FIG. 4 to facilitate their final bending or clinching by a power press. If desired short outwardly projecting ribs 43 may be molded on the outer faces of the walls 12 and spaced from the bottoms 36 of the extensions a distance corresponding to the thickness of the sheet metal from which the bracket is made, to give some support to the assembly.

Each of the elongated extensions 14 is formed in its top with recesses 38 separated by a central vertically extending and inwardly projecting boss 39 that has a screw threaded hole 40 which opens into a recess 40' formed in the center of the bottom of the extension 14. The formation of the recesses 38 leaves a transversely extending upwardly projecting rib or wall 41, the upper edge of which is in a plane below the plane of the top or front edge of the box, as seen in FIG. 6, so that the recesses are in communication with the interior of the box body. The openings 37 are formed in the bottoms of the recesses 38. The ends of the fastening strap of the switch, duplex outlet or other electrical device used in the box rest upon the tops of the bosses 39 and are secured by the usual screws that are threaded into the holes 40. The screw threaded holes 40 are preferably molded in accordance with the disclosure in the Baxter and Palmer Patent No. 2,775,916, January 1, 1957, and also molded with thin breakable plaster-excluding flashes over their outer screw receiving ends as disclosed in the Parker Patent No. 2,817,349, January 6, 1959, although such flashes are not shown in the drawings.

In assembling the device the plate 21 of the bracket is held at an angle to the side wall of the box and the prong portions 34 are inserted in the holes 37 and then the bracket is moved upwardly while inserting the hooks 30 in the holes 31. Then in a power press the ends 35 of the prongs are bent down as shown in FIG. 5. By thus fastening the bracket at about all four corners of one flat side face of the box a very strong connection is made and in a simple and inexpensive manner. However, it will be obvious that the two lower arms 28 might be replaced by a single centrally positioned arm with a hook to engage a hole in bottom 13 midway of its ends.

It will be noted that the three or more points of interlocking connection of parts of the bracket with the box body are widely spaced from each other and are located around the external boundary or peripheral portion of the flat side wall portion of the box. That arrangement not only provides an extremely strong and rigid connection but also strengthens and reenforces the side wall of the box. However the clinching of the upper arms 29 in the apertures in the extensions 14 provides a strong connection which may hold the body portion 21 against the flat side wall portion of the box when no hooks 30 are used on the bracket. It will be obvious that the recessed extensions 14 not only serve the above stated function but will greatly reenforce and strengthen the plastic box at the two main points of connection of the bracket to the box.

From the foregoing, taken in connection with the accompanying drawing, it will be seen that novel and advantageous provision has been made for carrying out the objects of the invention, and while preferences have been disclosed, attention is invited to the possibiilty of making variations within the scope of the invention as claimed.

I claim:

1. Means for permanently fastening a single metal mounting bracket to a wiring box after it has been molded of a plastic insulaitng material, without the use of screws or extraneous fastenings, comprising in combination, a molded insulating plastic box of generally rectangular shape having a bottom wall, side and end walls and an open face, at least one of said side walls being flat, elongated reenforcing extensions projecting endwise from the box and extending along said end walls at said open face, said extensions being recessed and having bottom walls formed with openings that open into the recesses, a single bracket for mounting the box and adapted to be fastened to a stud or the like, said bracket being formed of a single piece of sheet metal and comprising a flat attaching plate of substantial area disposed in contact with said one flat side wall, said plate extending at least throughout the length of said one wall, integral extensions at the ends of said plate and projecting beyond said end walls of the box, a pair of parallel attaching arms integral with said extensions of the plate and projecting at right angles to the plane of the latter, said arms being disposed against the outer faces of said end walls and being in supporting engagement with the bottom walls of the extensions on the box end walls, and bendable end portions on said arms extending outwardly through said openings and into said recesses, the extremities of said end portions being bent and clinched against the bottoms of said recesses, whereby the bracket will be permanently fixed to the molded plastic box without the use of extraneous fasteners and the box may be mounted by a single bracket.

2. The combination of claim 1 in which said bottom wall of the box has at least one recess disposed adjacent the said one flat side wall, together with at least one additional arm formed on said plate and extending rearwardly, and a hook on said additional arm engaged with said recess in the bottom wall of the box.

3. The combination of claim 1 in which said arms on the extensions of said plate are flat, together with arm-engaging ribs formed on said end walls of the box and spaced from the bottoms of said extensions on the box end walls a distance corresponding to the thickness of the metal from which the bracket is made.

4. Means for permanently fastening a single metal mounting bracket to a wiring box after it has been molded of a plastic insulating material, without the use of screws or extraneous fastenings, comprising in combination, a molded insulating plastic box of generally rectangular shape having a bottom wall, side and end walls and an open face, at least one of said side walls being flat and of generally rectangular shape, four recesses formed in the material of said box adjacent the four corners of said flat side wall, and a single preformed bracket for mounting said box on a stud or the like, said bracket being made from one piece of sheet metal and comprising a flat face plate of substantial area disposed in contact with said one flat side wall and extending longitudinally thereof, four arms integral with said plate and disposed adjacent the four corners of said flat side wall, and bent extremities on said arms interlockingly engaged with said four recesses whereby the bracket is permanently and rigidly fixed to said one rectangular flat side wall adjacent its four corners.

5. An electric wiring device comprising an open front face box for use as an outlet or junction box, molded of plastic insulating material and having a bottom with a surrounding wall, at least one portion of said wall being flat and of generally rectangular shape to provide a flat side wall, said bottom being formed with holes adjacent the rear corners of said flat side wall, recessed extensions adjacent the open face of said box and projecting outwardly beyond the ends of said flat side wall, openings in the bottoms of said extensions adjacent the front corners of said flat side wall, a sheet metal mounting bracket adapted to be secured to a building structure and disposed against said flat side wall, a pair of spaced hooks on said bracket engaged with said holes in the box bottom, and a pair of spaced arms on said bracket engaged with the bottoms of said extensions and having bent ends inserted in said openings and clinched in the recessed portions of said extensions.

6. The combination of claim 5 in which said bracket is of right angular shape having a flat attaching portion to lie against the edge of a stud or the like and provided with means whereby it may be attached to the latter, and a face plate portion to lie against said flat side wall of the box and having a pair of laterally spaced rearwardly projecting arms provided with said hooks, said first mentioned pair of arms having flat portions and disposed against the bottoms of said extensions and disposed in a plane substantially parallel with the plane of said attaching portion of the bracket.

7. The combination of claim 5 in which said box is of rectangular shape and has opposed side walls and opposed end walls from which latter said extensions project and extend across said end walls, the upper faces of said extensions being formed with recesses separated by a central upright boss adapted to support the ends of the fastening strap of an electrical device that may be used in the box, the formation of said recesses providing an upright transverse rib in the box with its upper edge beneath the plane of the open front face of the box, whereby the said recesses in the extensions will be in communication with the interior of the box, said openings in the extensions being formed in the bottoms of said recesses to dispose the clinched ends of said arms in said recesses.

8. The combination of claim 5 in which said box is of rectangular shape and has opposed side walls and opposed end walls from which latter said extensions project, said arms being flat, together with arm-engaging ribs formed on said end walls and spaced from the bottoms of said extensions a distance corresponding to the thickness of the metal from which the bracket is made.

References Cited in the file of this patent
UNITED STATES PATENTS

| | | |
|---|---|---|
| 1,898,282 | Almcrantz | Feb. 21, 1933 |
| 2,374,622 | Rugg | Apr. 24, 1945 |
| 2,773,115 | Despard | Dec. 4, 1956 |